United States Patent [19]
Sabin

[11] Patent Number: 5,938,344
[45] Date of Patent: Aug. 17, 1999

[54] TEMPERATURE COMPENSATING BEARING

[76] Inventor: Jeffrey M. Sabin, 424 Burt Cir., Lewiston, N.Y. 14092

[21] Appl. No.: 09/048,119

[22] Filed: Mar. 26, 1998

Related U.S. Application Data

[60] Provisional application No. 60/041,481, Mar. 26, 1997.

[51] Int. Cl.$^6$ ................................................. F16C 17/03
[52] U.S. Cl. ........................................ 384/278; 384/125
[58] Field of Search ........................... 384/10, 117, 119, 384/125, 116, 122, 309, 312, 192, 215, 222, 278, 905

[56] References Cited

U.S. PATENT DOCUMENTS

| | | | |
|---|---|---|---|
| 3,601,459 | 8/1971 | Cutting | 384/222 X |
| 3,980,353 | 9/1976 | Carlson . | |
| 4,033,642 | 7/1977 | Sorgatz et al. | 384/215 |
| 4,600,317 | 7/1986 | Mori | 384/117 |
| 4,627,746 | 12/1986 | Grisel et al. | 384/99 |
| 4,655,614 | 4/1987 | Schott | 384/215 X |
| 4,671,678 | 6/1987 | Munch | 384/125 |
| 4,714,357 | 12/1987 | Groth | 384/312 |
| 4,743,125 | 5/1988 | Dammel et al. | 384/99 |
| 4,790,672 | 12/1988 | Komplin | 384/125 |
| 5,033,871 | 7/1991 | Ide | 384/98 |
| 5,112,143 | 5/1992 | Ide | 384/117 |
| 5,205,652 | 4/1993 | Chapman | 384/119 |
| 5,215,385 | 6/1993 | Ide | 384/100 |
| 5,222,815 | 6/1993 | Ide | 384/117 |
| 5,284,392 | 2/1994 | Ide | 384/117 |
| 5,489,155 | 2/1996 | Ide | 384/117 |
| 5,531,524 | 7/1996 | Brouwer | 384/220 |
| 5,549,392 | 8/1996 | Anderson | 384/117 |
| 5,664,888 | 9/1997 | Sabin | 384/10 |

FOREIGN PATENT DOCUMENTS

| | | |
|---|---|---|
| 3544392 | 6/1987 | Germany . |
| 1458047 | 12/1976 | United Kingdom . |
| 1517160 | 7/1978 | United Kingdom . |
| 2273746 | 6/1994 | United Kingdom . |

*Primary Examiner*—Thomas R. Hannon
*Attorney, Agent, or Firm*—Richard C. Litman

[57] ABSTRACT

Temperature compensating bearings with bearing beams resiliently mounted to an outer shell to optimize load capacity for varying operating conditions, for example, bearings for precisely supporting a shaft for axial and rotational motion under various temperature, load, wear, and tolerance conditions. The bearing is capable of maintaining a contact fit despite wear, and is self-aligning, simple to manufacture, and operates quietly. The bearing is made up of an outer shell, a plurality of circumferentially spaced arcuate beams each connected to the outer shell by two radially extending support members located at either end of the beams, and a plurality of lubricant channels. The center of each beam is designed and configured to provide for an interference fit with the shaft, while the ends of each beam maintain a slight clearance with the shaft. As the outer shell contracts or expands due to temperature changes, the radial support members move towards or away from the shaft, respectively. The contraction or expansion due to changes in temperature will cause the beams to wrap or unwrap about the outer surface of the shaft, respectively. A plurality of lubricant channels are defined by the support members and the inner wall of the shell to supply lubricant, if needed, to any gaps between the shaft and the beams.

20 Claims, 5 Drawing Sheets

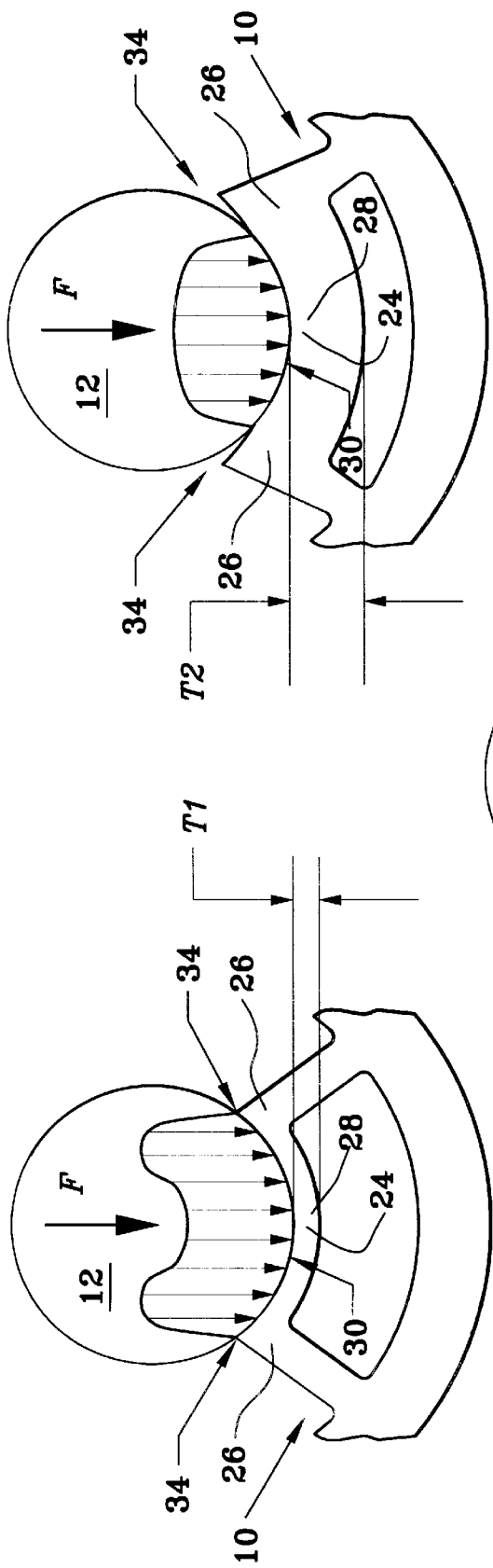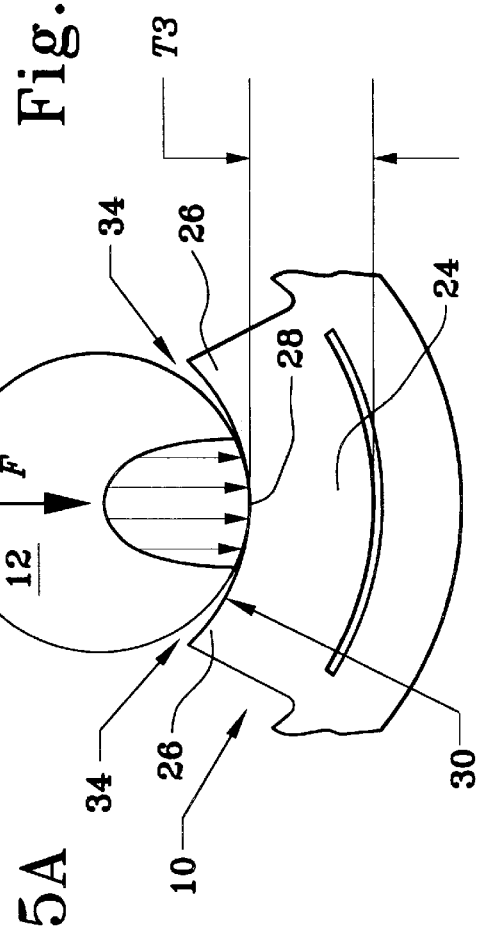

TEMPERATURE COMPENSATING BEARING

CROSS-REFERENCE TO RELATED APPLICATION

This application claims the benefit of U.S. Provisional Patent Application Ser. No. 60/041,481, filed Mar. 26, 1997. The present invention is related to a zero clearance bearing described in applicant's U.S. Pat. No. 5,664,888 issued on Sep. 9, 1997, which was a continuation of Ser. No. 500,482 filed on Jul. 10, 1995, now abandoned.

BACKGROUND OF THE INVENTION

1. Field of the Invention

The present invention relates to bearings that are resiliently mounted to an outer shell to optimize load capacity for varying operating conditions. More specifically, the present invention relates to bearings for precisely supporting a shaft for axial and rotational motion under various temperature, load, wear, and tolerance conditions.

2. Description of Related Art

Conventional bearings which are used to support a shaft during axial and rotational notion have inwardly extending bearing pads that are designed to deform slightly under loading in order to optimize formation of a converging hydrodynamic wedge that corrects for any shaft, misalignment. However, shaft misalignment may also occur at low load forces prior to the wedge formation in conventional hydrodynamic bearings (for example, when the shaft is rotating at a low angular velocity.)

Conventional bearing designs address the problems associated with high revolution per minute rotational shaft motion, yet do not address problems associated with high precision linear (axial) or rotational motion at low to medium speeds. Also, hydrodynamic bearings rely on lubrication such as air, oil or grease to form the hydrodynamic wedge.

Linear ball bearings specifically designed for high precision axial motion are expensive and may be cost prohibitive in many situations. Also less expensive standard sleeve bearings do not achieve a contact fit due to the tolerance build up of the shaft, housing, and the bearing itself. In both instances, a minimum clearance between the shaft and bearing is required for assembly and temperature compensation. This clearance condition will allow the shaft to move slightly within the bearing, thereby reducing the precision of the bearing.

Consequently, there is a need for a bearing that is capable of maintaining axial alignment of the shaft at low to medium axial and rotational speeds. The bearing should be capable of maintaining axial aligment of the shaft by adjusting in response to temperature. The bearing should be capable of maintaining a contact fit with the shaft despite the tolerance ranges of the shaft and the bearing and despite wearing of the bearing over time. The bearing should have stable bearing pads and good overall structural integrity. The bearing should also be capable of operating efficiently without the use of lubrication such as air, oil, or grease.

Some examples of various types of bearings that have been designed to support a rotating shaft are referenced as follows: U.S. Pat. No. 5,549,392 issued on Aug. 27, 1996, to William J. Anderson; U.S. Pat. No. 5,531,524 issued on Jul. 2, 1996, to Douglas J. Brouwer; U.S. Pat. No. 5,205,652 issued on Apr. 27, 1993, to William I. Chapman; U.S. Pat. No. 4,790,372, issued on Dec. 13, 1988, to Steven R. Komplin; U.S. Pat. No. 4,743,125 issued on May 10, 1988, to Uwe Dammel et al.; U.S. Pat. No. 4,671,678 issued on Jun. 9, 1987, to Günter Münch; U.S. Pat. No. 4,600,317 issued on Jul. 15, 1986, to Sanae Mori; U. K. Patent Application No. 2,273,746(A) published on Jun. 29, 1994; German Patent Application No. 3,544,392(A1) published on Jun. 19, 1987; U. K. Patent Application No. 1,517,160 published on Jul. 12, 1978; and U. K. Patent Application No. 1,458,047 published on Dec. 8, 1976. The above listed patents and patent publications do not solve the aforementioned problems as does the present invention.

U.S. Pat. No. 5,664,888 issued on Sep. 9, 1997 to Jeffrey M. Sabin describes zero clearance bearings which have an outer shell supporting three cantilevered arcuate bearing pads on fingers. These bearings are distinguishable from the present invention because (1) no temperature consideration was disclosed; (2) the cantilevered structure of the bearing pads do not suggest the present beam structure on outside legs; (3) the calculations for a simply supported beam of the present invention are different for a cantilevered bearing pad of the zero clearance bearing; and (4) the present inventive structure supports twice as much load as the cantilevered bearing pad on a finger.

U.S. Pat. No. 5,489,155 issued on Feb. 6, 1996, U.S. Pat. No. 5,284,392 issued on Feb. 8, 1994, U.S. Pat. No. 5,222,815 issued on Jun. 29, 1993, U.S. Pat. No. 5,215,385 issued on Jun. 1, 1993, and U.S. Pat. No. 5,112,143 issued on May 12, 1992, to Russell D. Ide describe bearings that include a plurality of circumferentially spaced bearing pads supported by various configurations of support members. These patents do not teach a bearing capable of maintaining axial alignment of the shaft by adjusting in response to temperature. These patents neither have the same stability in the bearing pads nor the same structural integrity in the outer shell as does the present invention.

U.S. Pat. No. 5,033,871 issued on Jul. 23, 1991, to Russell D. Ide describes an extrudable hydrodynamic bearing constructed entirely of non-newtonian fluidic materials or composites thereof. This patent does not teach a bearing capable of maintaining axial alignment of the shaft by adjusting in response to temperature.

U.S. Pat. No. 4,627,746 issued on Dec. 9, 1986, to Charles H. Grisel et al. describes a hydrodynamic fluid bearing assembly constituted by bearing members disposed around a rotary shaft with the interposition of a film of pressurized fluid. At least one of the members is subject to the action of a resilient member generating a limited pre-load force in order to maintain the assembly in its correct interrelationship when the shaft is stationary. The patent to Grisel et al. does not teach a bearing capable of maintaining axial alignment of the shaft by adjusting in response to temperature.

U.S. Pat. No. 3,980,352 issued on Sep. 14, 1976, to Jerome A. Carlson describes a spring bearing assembly comprising a bearing member (continuous or discontinuous) positioned between an inner race surface and an outer race surface. The bearing member is urged into constant positive contact with the race surfaces by internal bearing spring forces. The assembly is distinguishable by having internal and external races enclosing a spring tensioned bearing member.

U.S. Pat. No. 4,714,357 issued on Dec. 22, 1987, to Ronald W. Groth et al. describes a segmental bearing shoe for use in segmental bearings that rotably support a member by means of a plurality of bearing shoes. The device is distinguishable for its segmental structure.

None of the above inventions and patents, taken either singly or in combination, is seen to describe the instant invention as claimed. Thus, a temperature compensated bearing solving the aforementioned problems is desired.

SUMMARY OF THE INVENTION

The present invention relates to bearings that are resiliently mounted to an outer shell to optimize load capacity for varying operating conditions. More specifically, the present invention relates to bearings for precisely supporting a shaft for axial and rotational motion under various temperature, load, wear, and tolerance conditions. The invention is intended to provide a bearing which is capable of maintaining a contact fit despite wear, self-aligning, simple to manufacture, and operates quietly.

The invention comprises an outer shell, a plurality of circumferentially spaced arcuate beams each connected to the outer shell by two radially extending support members located at either end of the beams, and a plurality of lubricant channels. The center of each beam is designed and configured to provide for an interference fit with the shaft, while the ends of each beam maintain a slight clearance with the shaft. As the outer shell contracts or expands due to temperature changes, the radial support members move towards or away from the shaft, respectively. The contraction or expansion due to changes in temperature will cause the beams to wrap or unwrap about the outer surface of the shaft, respectively. A plurality of lubricant channels are defined by the support members and the inner wall of the shell to supply lubricant, if desired, to any gaps between the shaft and the beams.

Accordingly, it is a principal object of the invention to provide a bearing capable of maintaining a nonbinding contact fit at different temperature and tolerance ranges of the shaft and bearing.

It is another object of the invention to provide a bearing which is self-aligning relative to the shaft.

It is a further object of the invention to provide a bearing capable of operating quietly.

Still another object of the invention is to provide a bearing with the ability to optimize the Hertzian contact stresses.

A further object of the invention is to provide a bearing that will maintain contact fit with the shaft despite wearing of the bearing over time.

A still further object of the invention is to provide a bearing which is simple and economical to manufacture.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIGS. 5A, 5B, and 5C are partial end views of the bearing which illustrate the Hertzian contact stresses on three embodiments of the bearing having different beam thicknesses in response to a load F.

Similar reference characters denote corresponding features consistently throughout the attached drawings.

DETAILED DESCRIPTION OF THE PREFERRED EMBODIMENT

Figure 1:
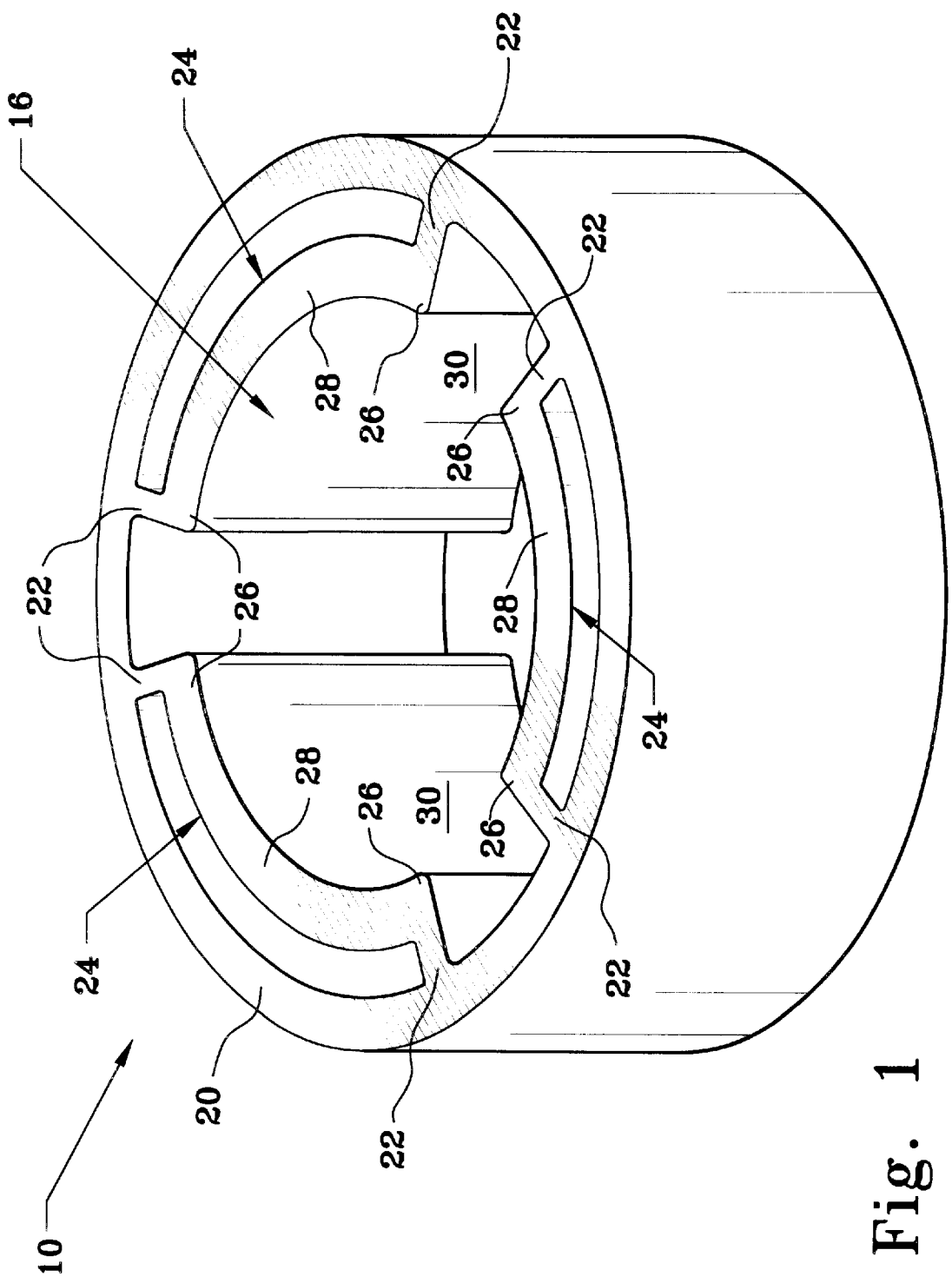
FIG. 1 is a perspective view of a bearing formed in accordance with the present invention.

Referring to FIG. 1, the bearing 10, according to the present invention, includes an outer shell 20 and a plurality of bearing beams or pads 24 each connected to the shell 20 at its ends by a pair of support members 22 in circumferentially spaced relationship to define a shaft opening 16.

Figure 2:
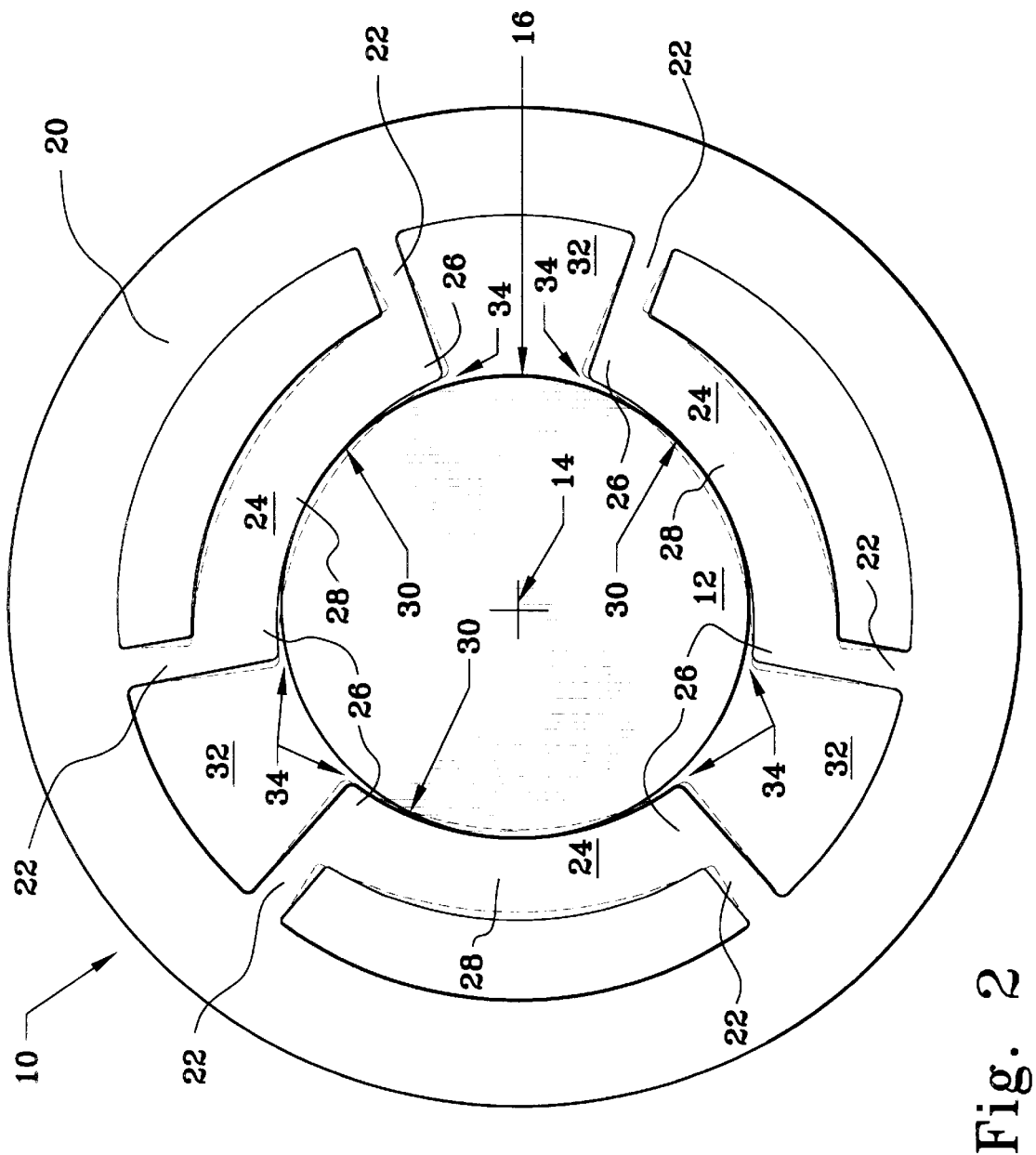
FIG. 2 is an end view of the present invention showing the shape of the bearing prior to the placement of the shaft within the bearing (broken lines) and the shape of the bearing after placement of the shaft within the bearing (solid lines) to illustrate the deflection of the bearing upon insertion of the shaft.

Referring also now to FIG. 2, a cylindrical shaft 12 is shown which is intended to be received within the shaft opening 16. Each of the bearing beams 24 has an arcuate contact surface 30 with a middle portion 28 that is arranged for interference fit with shaft 12. Each of the bearing beams 24 has end portions 26 that are arranged for a clearance fit with shaft 12.

The broken lines in FIG. 2 represent the shape of the bearing 10 prior to the insertion of the shaft 12. As best shown in FIG. 2, when the shaft 12 is inserted within the shaft opening 16, the middle portions 28 are forced to deflect toward the outer shell 20 to a position, represented by the solid lines, to accommodate the shaft 12. Simultaneously, the support members 22 are forced to deflect towards the middle portion 28.

The bearing 10 and, more critically, the bearing beams 24, are formed of a material exhibiting elastic deformation over the range of deflection necessitated by shaft 12. Consequently, deflected middle portions 28 are biased to exert a static pre-load on shaft 12, thereby providing a contact fit and alignment of the central axes 14 of the shaft 12 and the bearing 10. The middle portions 28 of the beams 24 will become worn over time due to axially directed travel along shaft 12 and rotational motion about the central axis 14. As the beams 24 become worn, their pre-loaded condition will serve to maintain a contact fit and an axial alignment between shaft 12 and bearing 10 by urging the middle portions 28 of the beams towards axis 14 for continued engagement with the shaft 12.

Figure 3:
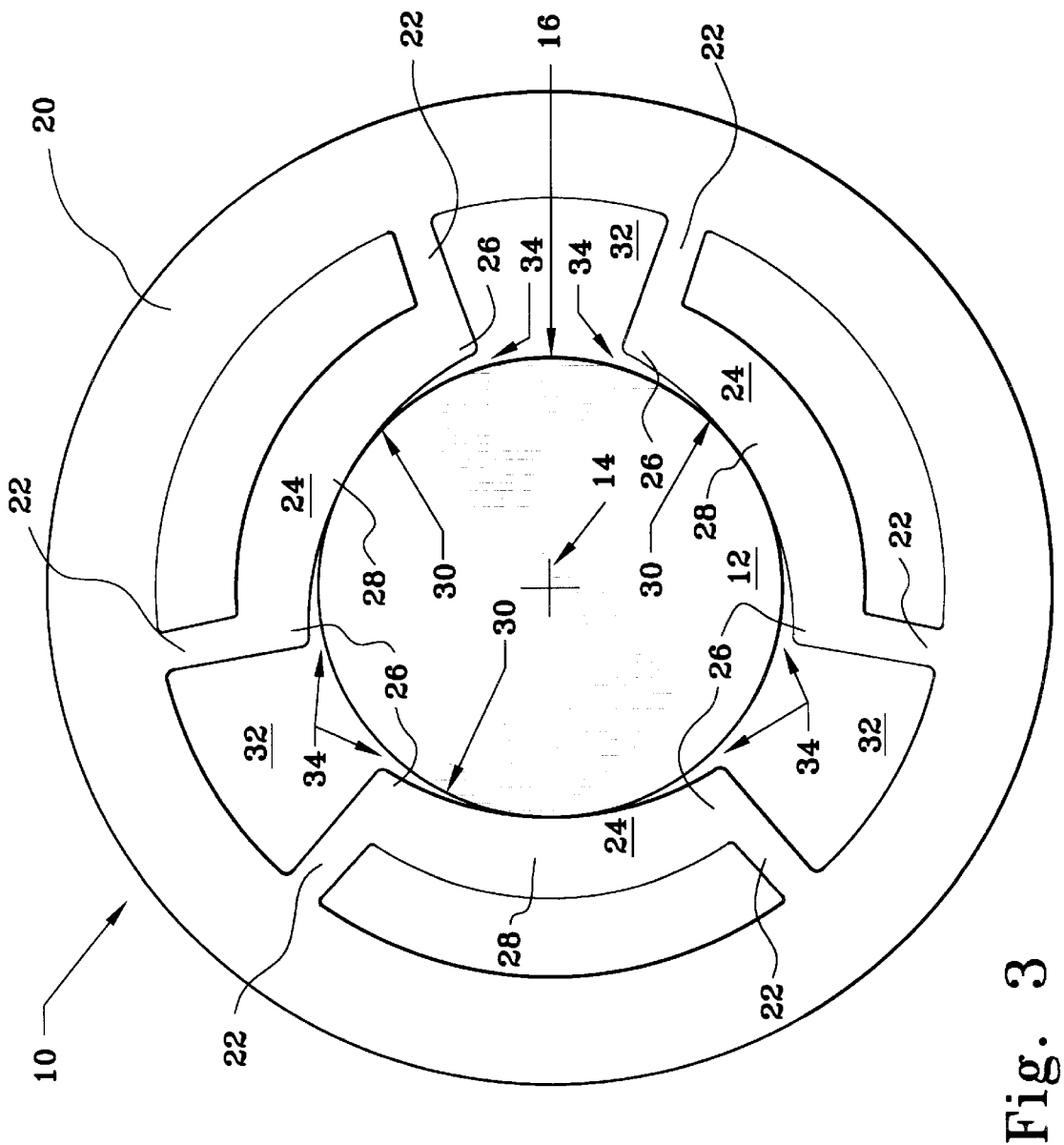
FIG. 3 is an end view of the present invention showing the shape of the bearing when the bearing is at an elevated temperature to illustrate the deflection of the bearing due to an increase in temperature of the bearing as compared with FIG. 2.

As the temperature of the bearing 10 increases, the outer shell 20 of the bearing 10 expands, as shown in FIG. 3, urging the support members 22 to move away from the central axis 14. The expansion of the outer shell 20 causes the arcuate contact surfaces 30 to flatten, yet the middle portions 28 of the beams 24 remain in contact with the shaft 12 due to the pre-load condition. As the temperature decreases, the outer shell 20 contracts, urging the support members 22 to move towards the central axis 14 and back to a state similar to that shown in FIG. 2. The bearing beams 24 are thus urged to wrap around the shaft 12 and to maintain a nonbinding contact fit with the shaft 12.

The biasing and frictional characteristics of bearing beams 24 and support members 22 will be influenced by several factors, including the effective length, the coefficient of friction, the modulus of elasticity, and the thickness of the beams 24 and the support members 22. These factors can be varied by the manufacturer in order to achieve design characteristics that are appropriate for the bearing's intended use.

In the preferred embodiment of the present invention, three bearing beams 24 are provided, as shown in FIGS. 1–4. The bearing 10 is also capable of being manufactured with as few as two bearing beams 24 or potentially a large number of beams 24 in proportion to an increasing diameter of the bearing 10. The beams 24 should be located on the outer shell 20 so that they are equally spaced about the axis 14. By evenly spacing the beams 24 about the axis 14, the bearing 10 will be more likely to correctly align the shaft 12 with the central axis 14.

As shown in FIGS. 2 and 3, lubrication channels 32 are located between the end portions 26 of each adjacent beam 24. The lubrication channels 32 are defined by part of the outer shell 20, an adjacent pair of support members 22, and the shaft 12. The lubrication channels 32 may be filled with a lubricating substance which is automatically supplied between the shaft 12 and the beams 24 through gaps 34 (FIGS. 2 and 3). Preferably, the bearing 10 should be sized and configured such that the gaps 34 are always present, even when the shaft 12 is initially inserted within the bearing 10, and the bearing 10 is at the coldest operating temperature as shown in FIG. 2.

Figure 4:
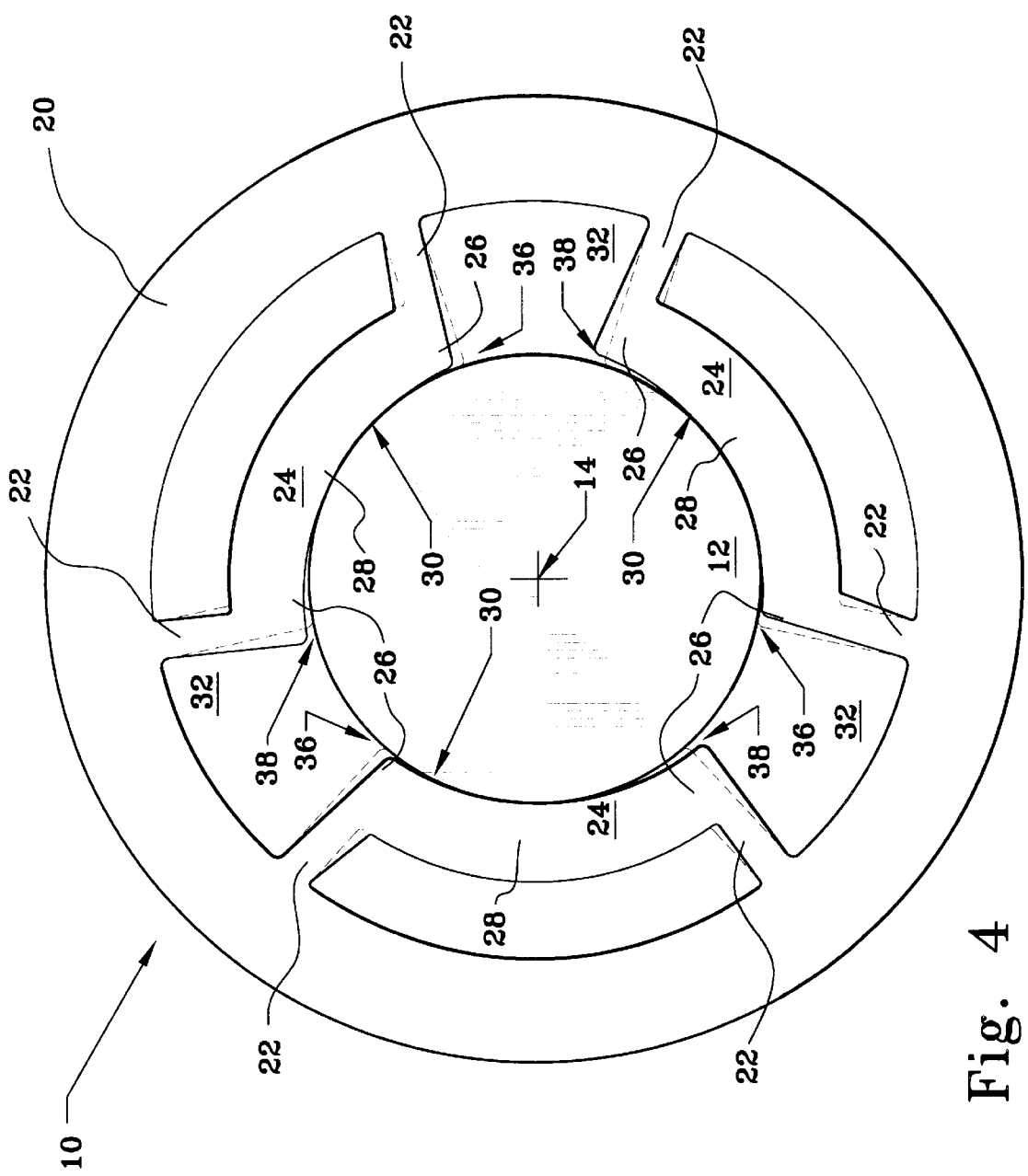
FIG. 4 is an end view of the present invention showing the shape of the bearing when the shaft is being rotated in a counterclockwise direction (solid lines) as compared to the shape of the bearing when the shaft is at rest (broken lines).

FIG. 4 shows a bearing 10 according to the present invention which is maintaining the axial alignment of the shaft 12 and the bearing 10 while the shaft 12 is being rotated in a counterclockwise direction about the axis 14. The frictional forces exerted on the beams 24 due to the rotation of the shaft 12 cause the support members 22 to bend slightly. The slight bending of the support members 22 causes the beams 24 to form a wedge-type formation in which gap 36 is smaller than gap 38. It should be noted that due to the shape and design of the bearing 10, the bearing 10 is capable of being used with a shaft 12 which is rotating in either a clockwise direction or a counterclockwise direction about axis 14.

FIGS. 5A, 5B, and 5C illustrate the Hertzian contact stress distributions for three different beam 24 thicknesses at a constant force F. The parallel force vector arrows are viewed at a point in time being applied against the arcuate surface 30 of the beam 24. The beam thickness T1 of the first embodiment shown in FIG. 5A, analogous to FIG. 1, is the narrowest of the three embodiments; and the beam thickness of the third embodiment T3 in FIG. 5C is the widest of the three embodiments.

FIG. 5A shows the first embodiment of the bearing 10 with the beam 24 deflecting such that gap 34 becomes almost nonexistent. The stress placed on the beam 24 is distributed evenly across the arcuate contact surface 30. The problem with this configuration is that a bind may occur at the end portions 26 when the shaft 12 is rotating about axis 14.

FIG. 5B shows the second, and the preferred, embodiment of the bearing 10 where the stress placed on the beam 24 is relatively well distributed across the arcuate contact surface 30. The second embodiment gives a preferred balance between distributing the stress across most of the arcuate contact surface 30, and yet allowing a gap 34 to remain at the end portions 26 to enable lubricant to be supplied between the shaft 12 and the beam 24.

FIG. 5C shows the third embodiment of the bearing 10 where the stress placed on the beam 24 is concentrated at the middle portion 28 of the arcuate contact surface 30. In the third embodiment, the high stress concentration in the middle portion 28 of the arcuate contact surface 30 will cause excessive wear at the middle portion 28. A stress distribution similar to that shown in FIG. 5B should be strived for when designing a bearing 10 for a particular use.

The temperature compensating bearing 10 of the present invention is particularly suited for precision or temperature applications involving predominantly rotational motion, e.g., supporting a shaft that feeds paper in a paper copier or supporting a wiper pivot body. It is presently preferred to manufacture bearing 10 as an integral unit from an acetal copolymer by either laser cutting, extrusion, or injection molding. It should be noted that other materials and manufacturing methods are possible, depending on the particular application and dimensional requirements of the bearing 10.

The temperature compensating bearing 10 of the present invention is a cost effective alternative to other bearings and provides stable axial and rotational support of a load relative to a shaft 12. It is recognized, however, that various bearing configurations falling within the scope of the present invention, differing from the preferred embodiment described herein, may be employed to suit particular applications. It is also to be understood that the present invention is not limited to the embodiments described above, but encompasses any and all embodiments within the scope of the following claims.

I claim:

1. A cylindrical temperature compensating bearing for supporting a cylindrical shaft for axial and rotational motion about a longitudinal axis, said bearing comprising;
    a cylindrical outer shell having a predetermined even thickness, and a cylindrical inner wall with a circumferential surface; and
    a plurality of evenly and circumferentially spaced beam structures, each said beam structure having two end portions and an arcuate middle portion, each said beam structure being independently connected to said outer shell by support members attached to said end portions;
    each said beam structure exerting a force onto the shaft, said beam structures being dimensioned and configured such that said force exerted on the shaft by said beam structures decreases as said bearing increases in temperature.

2. The temperature compensating bearing according to claim 1, wherein said middle portions have a predetermined thickness for distributing the axial stress of the cylindrical shaft on the beam structures.

3. The temperature compensating bearing according to claim 1, wherein each of said beam structures is resilient.

4. The temperature compensating bearing according to claim 1, wherein said support members are each oriented radially about said axis.

5. The temperature compensating bearing according to claim 1, wherein said bearing has at least three beam structures equidistantly spaced apart.

6. The temperature compensating bearing according to claim 1, further comprising channels between said bearing structures for distribution of lubricant.

7. The temperature compensating bearing according to claim 1, said bearing being non-metallic.

8. The temperature compensating bearing according to claim 1, wherein said bearing is formed as an integral, one-piece unit.

9. The temperature compensating bearing according to claim 1, wherein said bearing is constructed of an acetal copolymer composition.

10. The temperature compensating bearing according to claim 9, wherein said acetal copolymer composition is formed by a method selected from the group consisting of laser cutting, extrusion, and injection molding.

11. The temperature compensating bearing according to claim 10, wherein said method of forming is laser cutting.

12. The temperature compensating bearing according to claim 10, wherein said method of forming is extrusion.

13. The temperature compensating bearing according to claim 10, wherein said method of forming is injection molding.

14. A temperature compensating bearing for supporting a shaft for axial and rotational motion about an axis, said bearing comprising;

a cylindrical shell having an inner wall; and a plurality of evenly circumferentially spaced bearing beams connected to said inner wall of said shell, each of said bearing beams having an elastically deformable center portion, end portions, and a pair of support members which extend radially with respect to said axis, from said inner wall to said end portions of said bearing beams, said center portions being arranged for interference fit with the shaft prior to insertion of the shaft into said bearing, and said end portions being arranged for clearance fit with the shaft prior to and after insertion of the shaft into said bearing.

15. The temperature compensating bearing according to claim 14, wherein said bearing has three bearing beams.

16. The temperature compensating bearing according to claim 14, wherein said bearing is formed as an integral, one-piece unit.

17. The temperature compensating bearing according to claim 14, wherein said bearing beam is arcuate in shape.

18. The temperature compensating bearing according to claim 14, wherein a contact surface extends along said center portion of said bearing beam.

19. The temperature compensating bearing according to claim 14, including channels between said bearing structures.

20. The temperature compensating bearing according to claim 14, wherein said bearing is an acetal copolymer composition formed by a method selected from the group consisting of laser cutting, extrusion, and injection molding.

* * * * *